US011293078B2

(12) United States Patent
Bhave et al.

(10) Patent No.: US 11,293,078 B2
(45) Date of Patent: Apr. 5, 2022

(54) SEPARATION OF RARE EARTH ELEMENTS USING SUPPORTED MEMBRANE SOLVENT EXTRACTION

(71) Applicant: UT-Battelle, LLC, Oak Ridge, TN (US)

(72) Inventors: Ramesh R. Bhave, Knoxville, TN (US); Syed Z. Islam, Oak Ridge, TN (US); Vishwanath Deshmane, Painted Post, NY (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 302 days.

(21) Appl. No.: 16/537,759

(22) Filed: Aug. 12, 2019

(65) Prior Publication Data

US 2020/0056264 A1 Feb. 20, 2020

Related U.S. Application Data

(60) Provisional application No. 62/718,433, filed on Aug. 14, 2018.

(51) Int. Cl.
*C22B 59/00* (2006.01)
(52) U.S. Cl.
CPC .................... *C22B 59/00* (2013.01)
(58) Field of Classification Search
CPC ..................................... C22B 59/00
USPC ............................................ 75/722
See application file for complete search history.

(56) References Cited

U.S. PATENT DOCUMENTS

| 3,957,504 | A | 5/1976 | Ho |
| 4,051,230 | A | 9/1977 | Miyauchi |
| 5,192,443 | A | 3/1993 | Delloye et al. |
| 6,350,419 | B1 | 2/2002 | Ho |
| 6,521,117 | B2 | 2/2003 | Kocherginsky et al. |
| 8,999,168 | B2 | 4/2015 | Bhave et al. |
| 9,968,887 | B2 | 5/2018 | Bhave et al. |
| 2010/0224030 | A1 | 9/2010 | Liu et al. |

(Continued)

OTHER PUBLICATIONS

Fontas et al. "Selective enrichment of palladium from spent automotive catalysts by using a liquid membrane system", Journal of Membrane Science 223 (2003) 39-48 (Year: 2003).*

(Continued)

*Primary Examiner* — Brian D Walck
*Assistant Examiner* — Danielle M. Carda
(74) *Attorney, Agent, or Firm* — Warner Norcross + Judd LLP (57) ABSTRACT

A system and method for the recovery and separation of rare earth elements (REEs) are provided. The system and method include the supported membrane solvent extraction of REEs and the separation of light and heavy REEs that have been recovered from scrap permanent magnets and other electronic waste. In supported membrane solvent extraction, an organic phase consisting of an extractant and an organic solvent is immobilized in the pores of hollow fibers. An aqueous feed solution and a strip solution flow along the shell side and lumen side of the hollow fibers, respectively. The extractant functions as a carrier to selectively transport certain rare earth metal ions from the feed side to the strip side. The rare earth metals are concurrently back extracted in the strip solution, allowing processing to proceed continuously without equilibrium limitations.

17 Claims, 10 Drawing Sheets

(56) References Cited

U.S. PATENT DOCUMENTS

2013/0259776 A1 10/2013 Heres et al.
2016/0346736 A1* 12/2016 Bhave .................... B01D 69/08
2017/0022071 A1* 1/2017 Mudring ............... C01F 17/229

OTHER PUBLICATIONS

International Search Report and Written Opinion of PCT/US2020/014363 dated for Oct. 27, 2020.
Martinez, Joaquin, et al. "Factors influencing separation selectivity of rare earth elements in flat sheet supported liquid membranes." Chemical Engineering Science 191 (2018): 134-155.
Wannachod, Thanaporn, et al. "The separation of Nd (III) from mixed rare earth via hollow fiber supported liquid membrane and mass transfer analysis." Journal of Industrial and Engineering Chemistry 26 (2015): 214-217.
Pavon, Sandra, et al. "Comparison of Cyanex 272 and Cyanex 572 for the separation of Neodymium from a Nd/Tb/Dy mixture by pertraction." Journal of Chemical Technology & Biotechnology 93.8 (2018): 2152-2159.
Zulfikar, Muhammad Ali, et al. "Transport and Separation of Some Rare Earth Elements (REEs) Through Stripping Hollow Fiber Supported Liquid Membrane (SHFSLM) with Di—di-(2-ethylhexyl) Phosphoric acid and Trybutylphosphate as a Carriers." Australian Journal of Basic and Applied Sciences. 8.10. (2014): 525-531.
Wannachod, Thanaporn, et al. "Separation and mass transport of Nd (III) from mixed rare earths via hollow fiber supported liquid membrane: experiment and modeling." Chemical Engineering Journal 248 (2014): 158-167.

\* cited by examiner

SEPARATION OF RARE EARTH ELEMENTS USING SUPPORTED MEMBRANE SOLVENT EXTRACTION

CROSS-REFERENCE TO RELATED APPLICATIONS

This application claims the benefit of U.S. Provisional Application 62/718,433, filed Aug. 14, 2018, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to methods for separating rare earth elements that have been recovered from scrap permanent magnets and other end-of-life products.

In recent years, rare earth elements, particularly dysprosium (Dy), praseodymium (Pr), and neodymium (Nd), have drawn a significant attention worldwide and have become strategically critical for the security of global economy, energy, transportation, and communications. This is due to their perennial increasing use in various high technologies including hybrid and electric vehicles, wind turbines, mobile, tablets, personal computers, a wide range of devices with electric motors, and many other technological innovations.

Rare earth magnets are strong permanent magnets made from alloys of rare earth elements. It is estimated that over ten thousand tons of scrap permanent magnets of hard disk drives containing Nd, Dy, and Pr, are available for recycling. Rare earth magnets are typically not recycled however. In the case of hard drives, more than 500 million hard drives are manufactured annually. Disposal operations primarily include shredding hard drives with e-waste recyclers. Steel and aluminum are typically electromagnetically sorted from the shredded material stream for recycling. The remaining components, including the rare earth magnets, are treated as waste.

The content of Dy in scrap permanent magnets varies significantly in their applications. For example, while hard disk drives contain about 1-3 wt. % of Dy among rare earth elements (REEs), hybrid and electric cars applications include about 20-25 wt. % of Dy. Typically, Dy content of up to 10 wt. % in the REEs recovered from mixed permanent magnets are expected. Recent methods were developed for the recovery of rare earth elements from permanent magnets and other post-consumer products. For example, U.S. Pat. No. 9,968,887 to Bhave et al, the disclosure of which is hereby incorporated by reference in its entirety, discloses a method for the recovery of rare earth elements from commercial scrap permanent magnets. The method generally includes directing an aqueous feed solution through or around hollow fibers for the extraction of rare earth elements into a strip solution, wherein the pores of the hollow fibers are wetted with an immobilized organic phase. Examples performed according to this method were shown to recover high concentrations of rare earth oxides, including for example oxides of Nd, Pr, and Dy.

While a combined form of Nd and Pr is acceptable in many industrial applications, separation of Dy from Nd and Pr is critical for the production of powerful magnets, which contribute to almost every major defense system including advanced fighter aircraft, naval vessels, and ground equipment. Further, Dy is an essential component of almost all types of permanent magnets including laptop hard disk drives, hybrid/electric cars, and wind turbines due to their very specific properties such as coercivity, high temperature tolerance, and corrosion resistance. The demand for Dy is estimated to increase every year and will exceed 800 tons in 2020, which is nearly double the amount used in 2011. While the demand of Dy is continuously increasing, its supply, however, is uncertain because most of its production is limited to a single source in southern China, and the amount of Dy available in mines is also limited. Furthermore, because of its several specific high-technology applications, Dy has high criticality and commands almost a four-fold higher market value compared to Nd and Pr. The limited production and supply and the high economic rewards demand the recovery, separation and purification of Dy from mixed rare earth oxides recovered from scrap permanent magnets. Thus, the separation of Dy from other rare earth elements is of significant commercial interest. Finally, separation of Dy from mixed rare earth oxides, particularly NdPrDy, will lead to two pure products including Dy and NdPr, which have significant market values in their individual form. If Dy can be separated in its pure form, it can be added to any rare earth oxide mixture to meet end-user specifications for various applications for recycling and reuse of recovered rare earth elements from scrap magnets.

Accordingly, there remains a need for systems and methods for the separation of rare earth elements that have been recovered from rare earth magnets and other end-of-life products. In particular, there remains a need for an improved process for the separation of light rare earth elements, such as Nd and Pr, from heavy rare earth elements, such as Dy. It is also desirable to recover rare earth elements in a highly pure form that is suitable for direct reuse with minimal processing.

SUMMARY OF THE INVENTION

A system and method for the separation of recovered rare earth elements are provided. The system and method include the supported membrane solvent extraction of rare earth elements and rare earth element oxides that have been recovered from permanent magnets and other electronic waste. In supported membrane solvent extraction, an organic phase consisting of an extractant and an organic solvent is immobilized in the pores of hollow fibers. An aqueous feed solution and a strip solution flow along the shell side and the lumen side of the hollow fibers, respectively. The extractant functions as a carrier to selectively transport certain rare earth metals from the feed side to the strip side. The rare earth metals are back-extracted in the strip solution, allowing processing to proceed continuously without equilibrium limitations.

In one embodiment in which oxides of Dy are separated from oxides of Nd and Pr, the permeable hollow fibers are hydrophobic polypropylene hollow fiber membrane modules that are oriented in a common direction between opposing tubesheets. The hollow fibers can include a bundle assembly with several thousands of fibers having an inner diameter of about 0.24 mm, and outer diameter of about 0.30 mm, a pore size of about 30 nm, and membrane area of about 1.4 m². The immobilized organic phase includes a solvent and an extractant. The organic phase can include an isoparaffinic hydrocarbon solvent and a phosphorous-based chelating extractant and with a ratio by volume of between 1:1 and 3:1 or any other combination. The feed solution can include a pH maintained between 0 and 2.0, further optionally between 1.0 and 1.5.

Dy with 100% purity was separated according to the foregoing method in only three stages, using Cyanex 572 as an extractant. Compared to the conventional technologies such as hydrometallurgy, pyrometallurgy, hydrogen decrepitation, and solvent extraction, supported membrane solvent extraction offers several significant advantages. The prominent advantages of supported membrane solvent extraction include minimal usage of chemicals and waste generation, low extractant inventory, operation at ambient temperature and low pressure, and the ability to process highly contaminated/diverse samples such as shredded scrap mixtures. The extraction and recovery is accomplished in a single step process without emulsion formation and equilibrium limitations. The modular configuration allows process flexibility in terms of production capacities. High purity products and high separation factor (high selectivity for REEs over non-REEs) are achieved due to the lack of solvent entrainment phenomena. Furthermore, supported membrane solvent extraction requires low energy consumption, and low operating and capital costs.

These and other features and advantages of the present invention will become apparent from the following description of the invention, when viewed in accordance with the accompanying drawings and appended claims.

DETAILED DESCRIPTION OF THE CURRENT EMBODIMENTS

As discussed herein, the system according to one embodiment includes supported membrane solvent extraction for the separation of heavy rare earth elements from light rare earth elements, each having been collectively recovered from scrap permanent magnets as mixed rare earth element oxides in substantially pure form (e.g., greater than 90%, optionally greater than 99.5%, by weight of rare earth element oxides).

Figure 1:
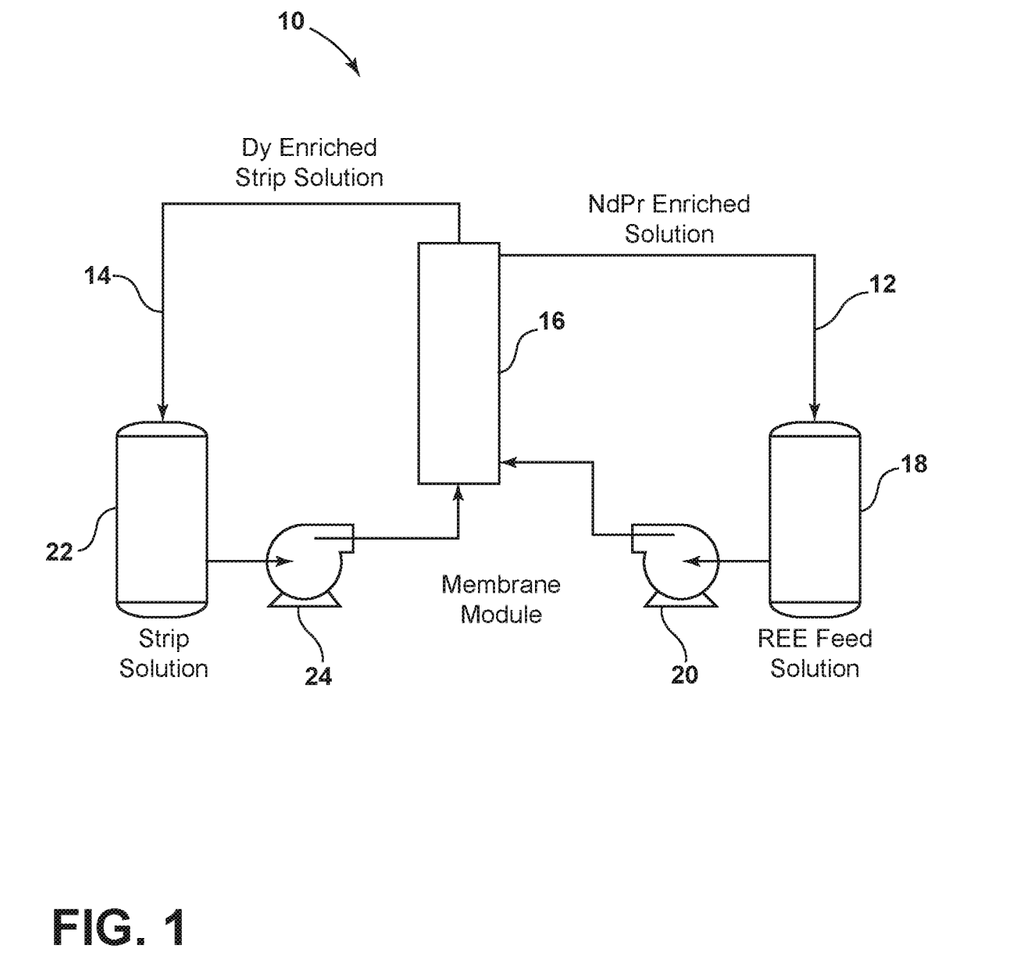
FIG. 1 is an illustration of a system for supported membrane solvent extraction for the separation of rare earth elements.

Referring now to FIG. 1, a system for the separation of rare earth elements (REE)—for example the separation of heavy rare earth elements such as Dy from light rare earth elements such as Nd and Pr—is illustrated and generally designated 10. The system generally includes a feed line 12, a strip line 14, and a hollow fiber membrane module 16. As discussed below, the hollow fiber membrane module 16 includes a bundle assembly of hollow fibers oriented in a common direction between opposing tubesheets. The REE feed solution is contained within a feed reservoir 18 and is mixed to ensure a uniform concentration. The feed solution is circulated through the hollow fiber membrane module 16 in a closed loop under pressure from a first pump 20, for example a peristaltic pump, optionally ensuring the feed line pressure is greater than the strip line pressure. The strip line 14 includes a reservoir 22 and a pump 24, for example a peristaltic pump, to ensure a continuous flow of strip solution through the module 16. Both of the feed line 12 and the strip line 14 are shown as a closed circuit in FIG. 1, such that the feed solution and the strip solution are in continuous recirculation. However, in other embodiments the feed line and/or the strip line form an open circuit.

Figure 2:
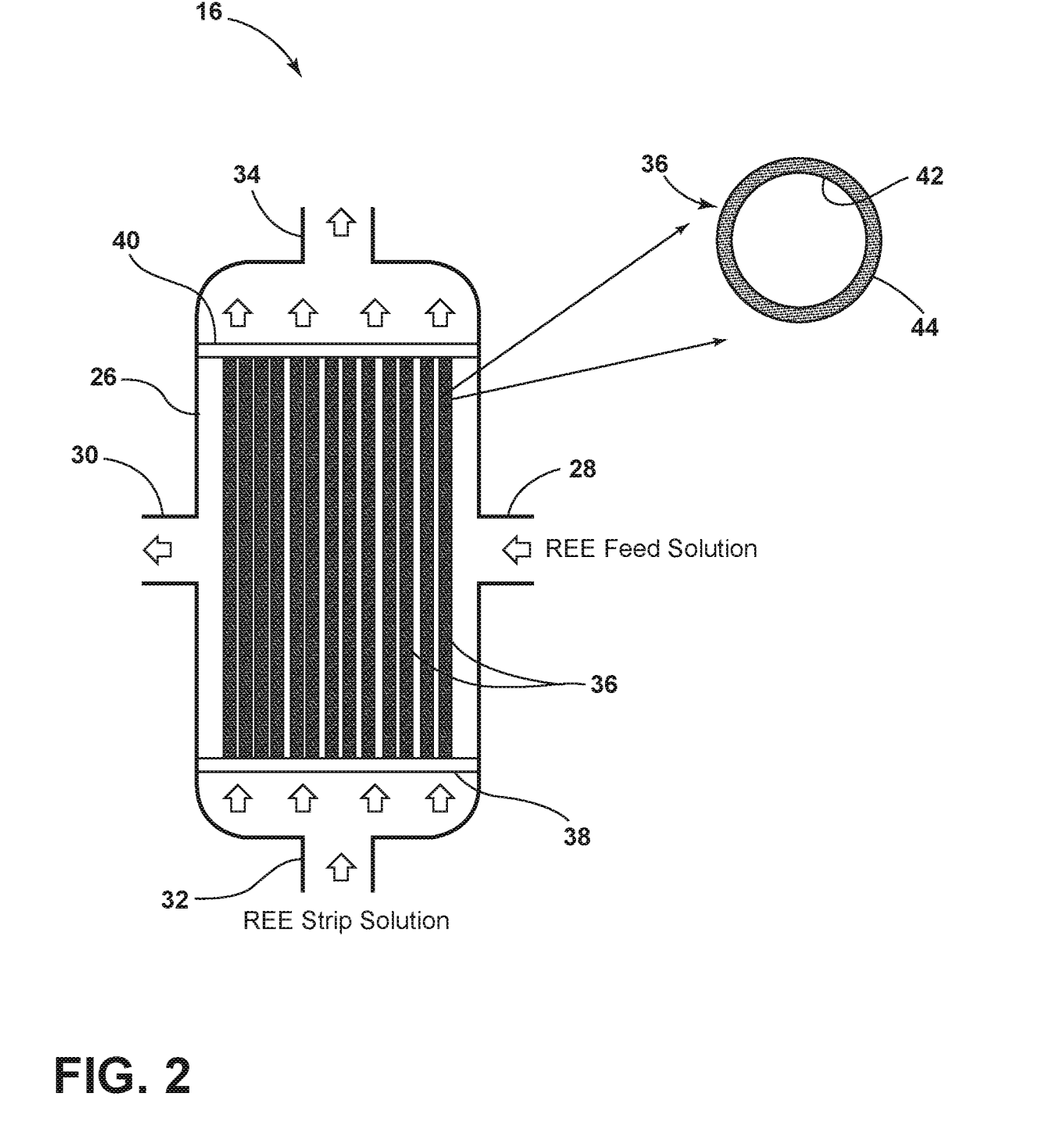
FIG. 2 is an illustration of a supported membrane solvent extraction module including porous hollow fibers.

A membrane module containing a fiber bundle is illustrated in FIG. 2 and generally designated 16. The membrane module 16 includes an outer casing 26 defining a feed input port 28, a feed output port 30, a strip input port 32, and a strip output port 34. The plurality of fibers 36 are potted to first and second tubesheets 38, 40 at opposing ends thereof, such that the fibers 36 extending in a common direction within the module 16. Each fiber 36 includes a lumen side 42 and a shell side 44. The lumen side 42 is illustrated in FIG. 2 as being exposed to the strip solution, however in other embodiments the lumen side 42 is exposed to the feed solution. Similarly, the shell side 44 is illustrated in FIG. 2 as being exposed to the feed solution, however in other embodiments the shell side 44 is exposed to the strip solution.

As used herein, the "lumen side" includes the interior surface that defines a channel extending longitudinally through the length of the hollow fiber, and the "shell side" includes the exterior surface of the fiber, such that the lumen side and the shell side are spaced apart from each other by the thickness of the membrane sidewall. The side in contact with the feed solution defines the "feed interface," and the side in contact with the strip solution defines the "strip interface." Consequently, the lumen side is the feed interface in some embodiments and is the strip interface in other embodiments. Similarly, the shell side is the strip interface in some embodiments and is the feed interface in other embodiments.

The REE feed solution includes rare earth elements that have been previously separated from non-rare earth elements. For example, the feed solution can be extracted according to the membrane assisted solvent extraction process set forth in U.S. Pat. No. 9,968,887 to Bhave et al, in which rare earth elements (such as Nd, Dy, and Pr) are recovered from commercial scrap magnets (also containing non-rare earth elements as Fe and B). The feed solution includes, as a first component, a dry mixture of two or more different rare earth element oxides (e.g., in a composition of greater than 90%, optionally greater than 99.5%, by weight of rare earth element oxides), and, as a second component, a solution of dilute nitric acid, for example 0.02 M nitric acid. Example rare earth element oxides (REOs) include $Nd_2O_3$, $Pr_2O_3$, $Pr_6O_{11}$, and $Dy_2O_3$, though other rare earth element oxides can be used in other embodiments. In still other embodiments, the feed solution can include a mixture of two or more different rare earth elements not in oxide form, but with a purity of at least 90% by weight, optionally at least 99.5% by weight, in combination with a solution of dilute nitric acid.

The pH of the feed solution is generally maintained at between 0 and 2.0, consistent with the best operating mode for the cationic extractant, further optionally between 1.0 and 1.5. The strip solution is generally selected to strip heavy rare earth element complexes that have diffused from the feed interface to the strip interface. The strip solution can include $HNO_3$, HCl, or $H_2SO_4$, for example, at a higher molar concentration than in the feed solution. For example, the strip solution can include 3.0 M $HNO_3$ in comparison to the feed solution of 0.02 M $HNO_3$. As shown in FIG. 1, the strip solution is contained within a second reservoir 22 and is circulated through the hollow fiber membrane module 16 in a closed loop under pressure from a second pump 24.

As noted above, the hollow fiber membrane module 16 includes an organic phase consisting of an extractant and an organic solvent immobilized in the pores of the hollow fibers. The extractant is a phosphorous-based chelating extractant in the current embodiment, for example Cyanex 572 by Cytec Industries, Inc. Alternatively, the extractant can be a neutral extractant, for example tetraoctyl diglycolamide ("TODGA"). However, other extractants such as trialkyl phosphine oxide, 2-ethylhexyl phosphonic acid mono-2-etylhexyl ester, carbamoyl phosphoryl oxides, sec-octyl phenoxy acetic acid or Cyanex 272 can be used in other embodiments. The organic solvent includes an isoparaffinic hydrocarbon solvent, for example Isopar L from ExxonMobil Chemical, however other solvents such as tributyl phosphate, xylene, hexane, octanol or kerosene can be used in other embodiments. In the current embodiment, the pores of the hollow fibers are pre-impregnated with the organic phase, consisting of the isoparaffinic hydrocarbon solvent and the phosphorous-based chelating extractant, with a ratio by volume of between 3:1 and 1:1, further optionally 2:1. The pore size is selected based on capillary forces necessary to hold the organic phase into the pores of the membrane fibers, for example between approximately 0.01 micron and approximately 1.0 micron, or about 30 nm in the present embodiment.

Figure 3:
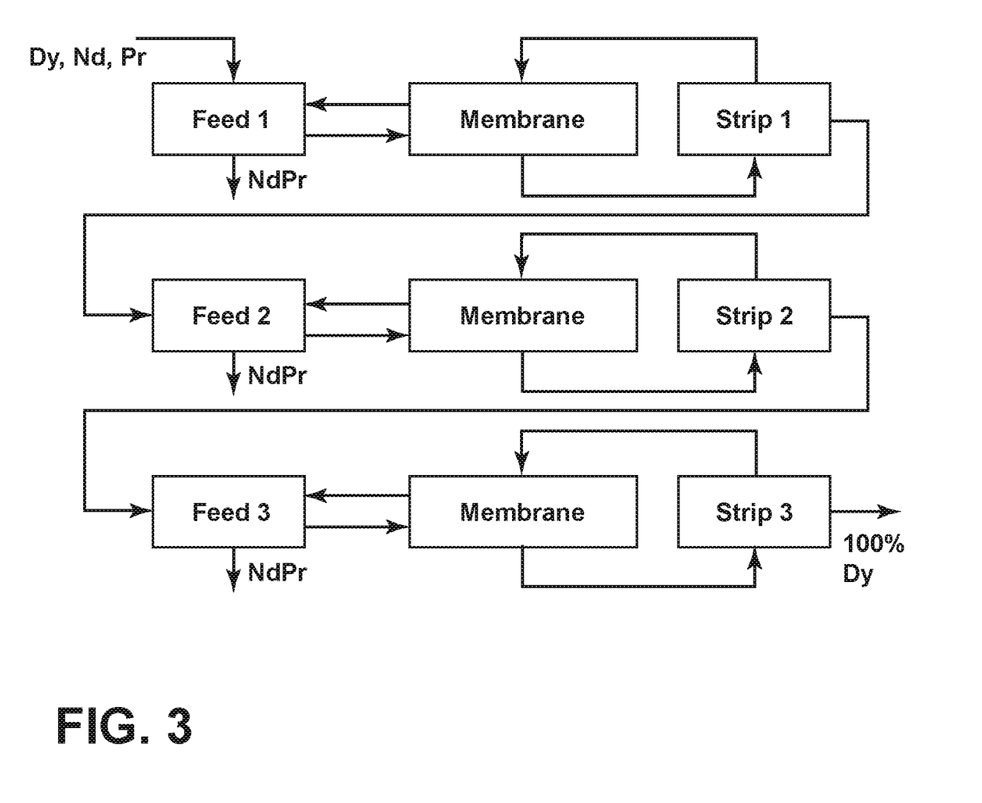
FIG. 3 is an illustration of a multi-stage system for supported membrane solvent extraction.

As shown in FIG. 3, the separation of heavy rare earth elements (e.g., Dy) from light rare earth elements (e.g., Nd and Pr) can occur in multiple stages. In one embodiment, the first stage separation is conducted for a first predetermined time period, for example twenty four hours, where the feed solution and the strip solution are continuously recirculated through the membrane module 16. The feed solution containing REOs are previously recovered from scrap magnets dissolved in 0.02 M nitric acid feed solution. In this first stage, the pH of the feed solution can be maintained at 0 to 2.0. For the second stage of separation, the pH of the Dy, heavy REE-enriched strip solution from the first stage is adjusted (increased) to between 0 and 2.0, optionally 1.5, using ammonium hydroxide and is used as the feed solution for the second stage. The strip solution can be filtered to remove any precipitated salts. The second stage of separation can occur over a second predetermined time period, optionally less than the first predetermined time period, for example ten hours, where the feed solution and the strip solution are continuously recirculated through the membrane module 16. For the third stage of separation, the pH of the Dy, heavy REE-enriched strip solution can be adjusted (increased) to between 1.0 and 2.0, optionally 1.5. The third stage of separation can occur over a third predetermined time period, for example ten hours, where the feed solution and the strip solution are continuously recirculated through the membrane module 16. In each separation stage, the membrane module 16 includes an organic phase of Cyanex 572 (33 v/v %) and Isopar L (67 v/v %), or other combination of the organic phase constituents, and the strip solution includes 3.0 M nitric acid or other appropriate concentration based on feed solution conditions. At the conclusion of the third stage of separation, the heavy rare earth element Dy is in substantially pure form, optionally greater than 99.5% by weight, being separated from lighter rare earth elements, for example Nd and Pr.

To reiterate, the system according to one embodiment includes supported membrane solvent extraction for the separation of heavy rare earth elements from light rare earth elements, each having been collectively recovered from scrap permanent magnets as mixed rare earth element oxides in substantially pure form (e.g., greater than 90%, optionally at least 99.5% by weight of rare earth element oxides). A flow chart illustrating supported membrane solvent extraction in accordance with one embodiment is presented in FIG. 4. In general terms, the method can include the following steps: a) recovering mixed rare earth element oxides from scrap permanent magnets or other electronic waste (50), b) pre-impregnating the pores of the plurality of permeable hollow fibers with an organic phase including an extractant and an organic solvent (52), c) applying a continuous flow rate of an acidic aqueous feed solution including dissolved rare earth element oxides along the lumen side or the shell side of the plurality of permeable hollow fibers (54), d) applying a continuous flow rate of an acidic strip solution along the other of the lumen side or the shell side of the plurality of permeable hollow fibers (56), and e) after a predetermined time period, repeating steps c) and d) for a further stage of rare earth element separation using the strip solution from the immediately preceding stage as the feed solution for the subsequent stage (58). The steps of applying a feed solution at step c) and applying a strip solution at step d) are simultaneous to provide simultaneous extraction (by the organic phase) and stripping (by the strip solution) of heavy rare earth elements such as Dy.

As noted above, the step of recovering mixed rare earth element oxides at step a) can be performed in accordance with the method for membrane assisted solvent extraction set forth in U.S. Pat. No. 9,968,887 to Bhave et al, resulting in mixed rare earth element oxides in substantially pure form (e.g., a mixture of substantially 90% by weight, optionally at least 99.5% by weight, of two or more rare earth element oxides). Pre-impregnating the pores of the plurality of hollow fibers with an organic phase at step b) can include wetting the pores with an isoparaffinic hydrocarbon solvent and a phosphorous-based chelating extractant, with a ratio by volume of between 3:1 and 1:1, further optionally 2:1, or any other combination. Applying a continuous flow rate of an acidic aqueous feed solution along the lumen side or the shell side of the plurality of permeable fibers at step c) can include providing an acidic aqueous feed solution including dissolved rare earth elements from post-consumer products, end-of-life products, and other sources of rare earth elements. The acidic aqueous feed solution can include $HNO_3$, HCl, or $H_2SO_4$ or other mineral acids for example, at the desired molar concentration. Applying a continuous flow rate of an acidic strip solution at step d) can include $HNO_3$, HCl, or $H_2SO_4$, for example, at a higher molar concentration than in the feed solution. Repeating steps c) and d) is performed after a given time period has elapsed for each separation stage, in which the strip solution for the preceding stage is diluted to increase the pH for use as a feed solution in the subsequent stage.

Example 1

Figure 4:
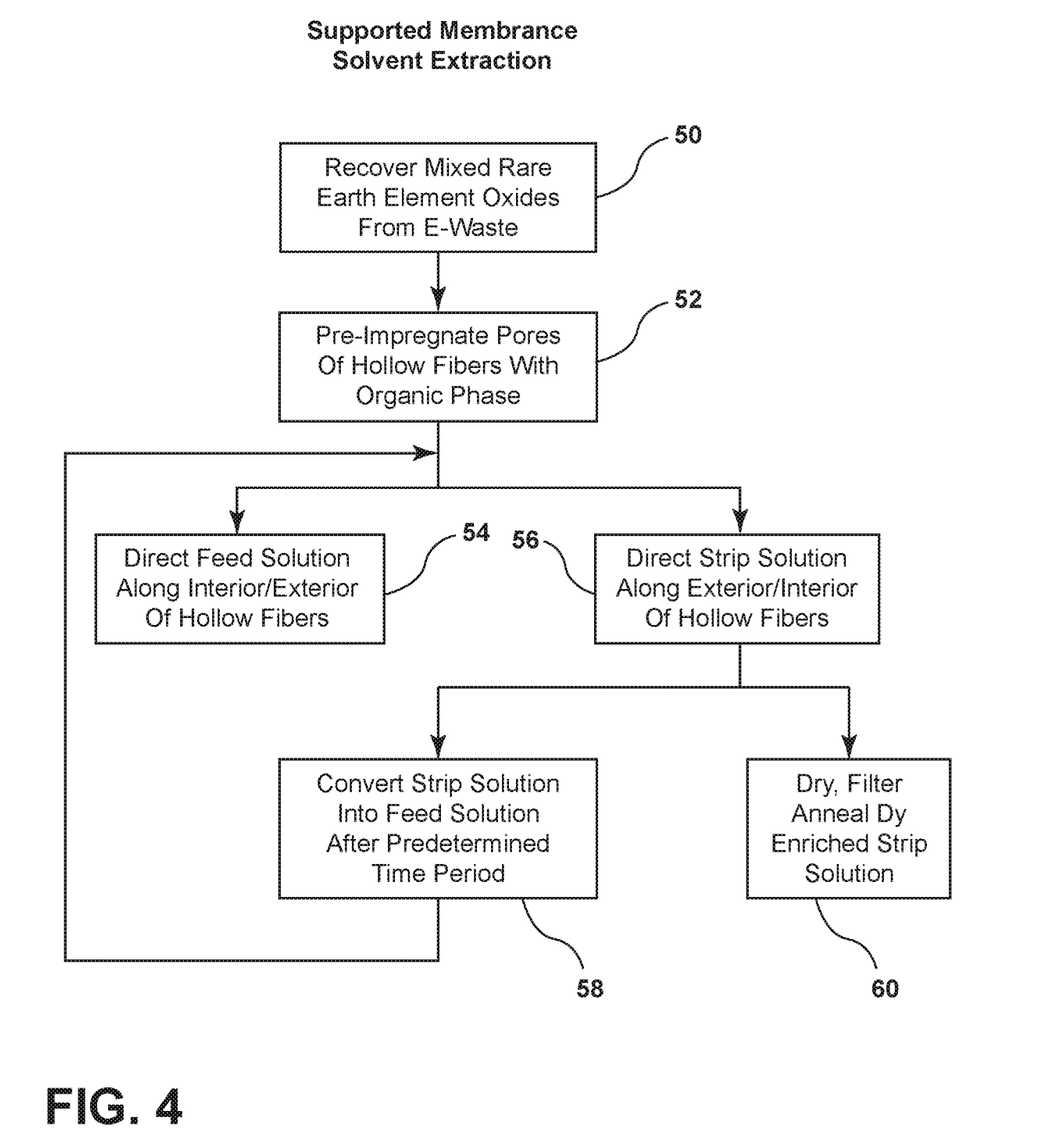
FIG. 4 is a flow diagram of a method for supported membrane solvent extraction for the separation of rare earth elements.
Figure 5A:
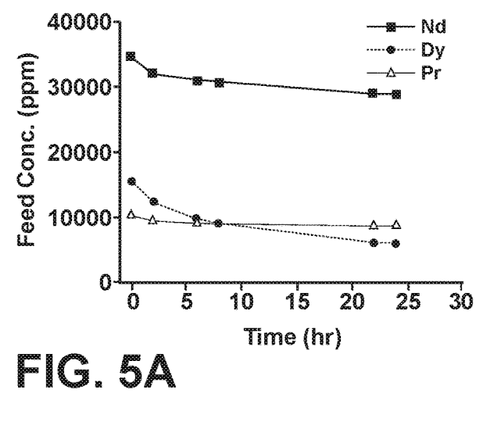
FIGS. 5A to 5F are graphs illustrating the stage-one recovery of Dy from mixed rare earth element oxides.
Figure 5B:
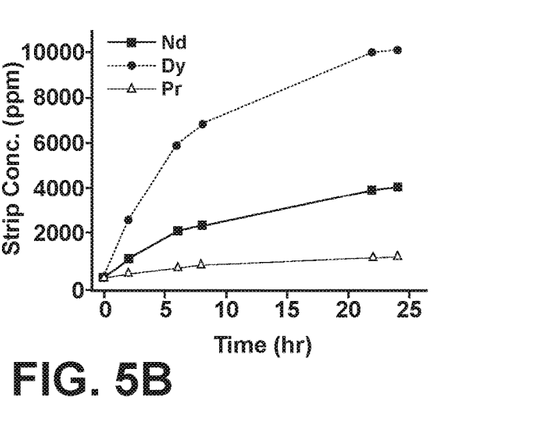
Figure 5C:
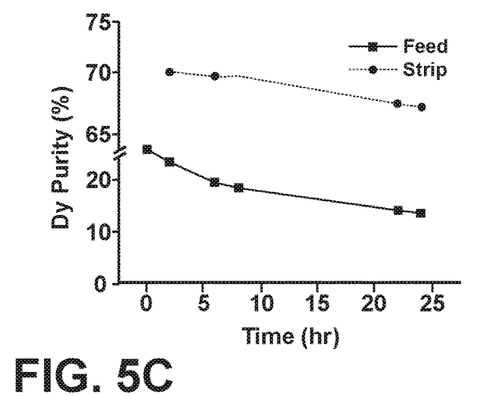
Figure 5D:
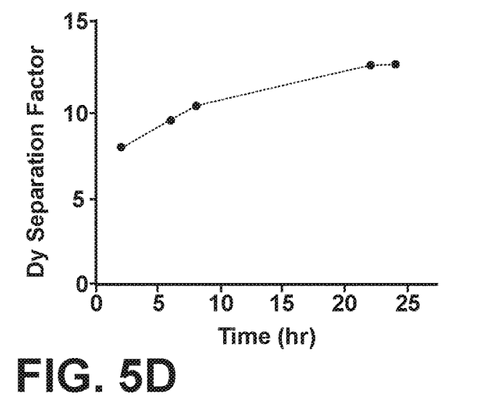
Figure 5E:
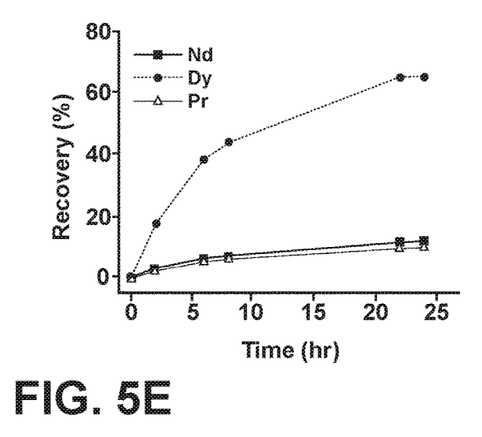
Figure 5F:
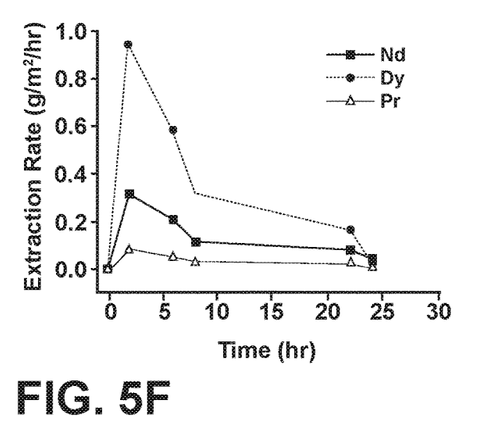
Figure 6A:
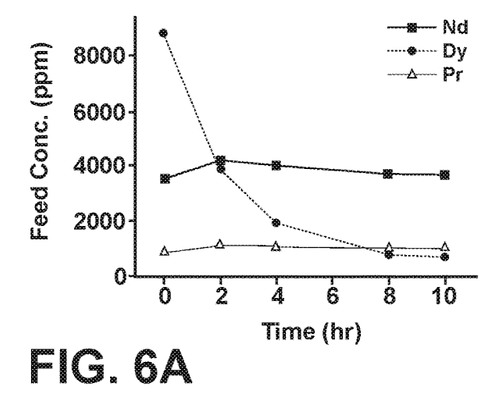
FIGS. 6A to 6F are graphs illustrating the stage-two recovery of Dy from mixed rare earth element oxides.
Figure 6B:
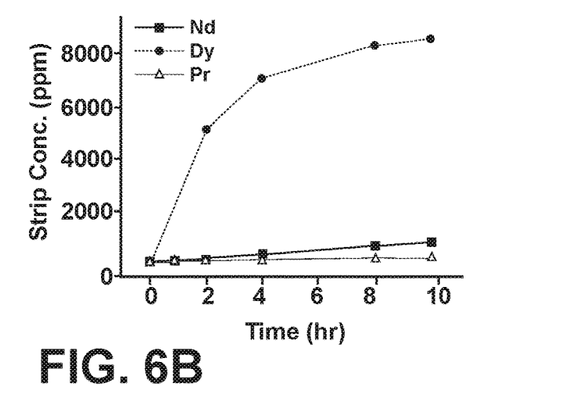
Figure 6C:
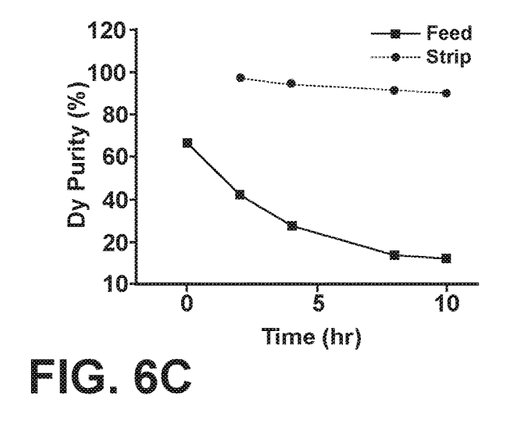
Figure 6D:
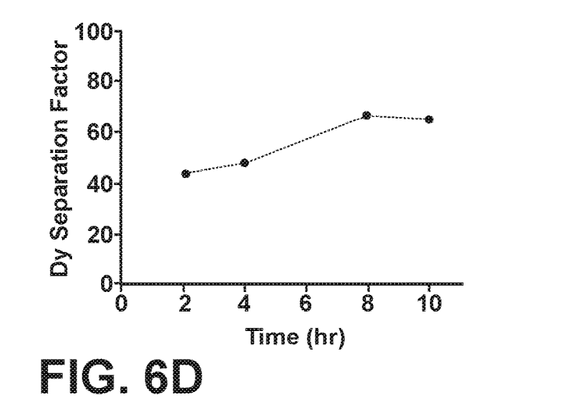
Figure 6E:
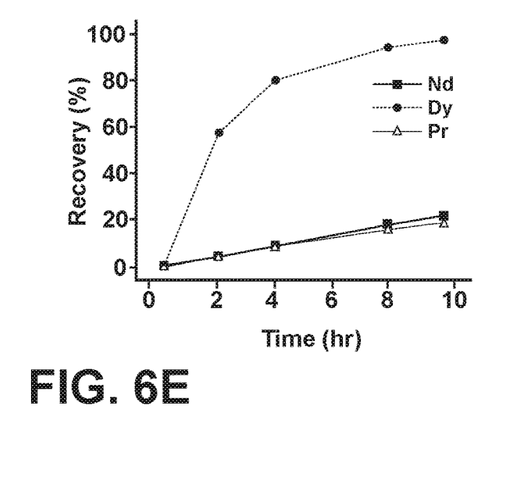
Figure 6F:
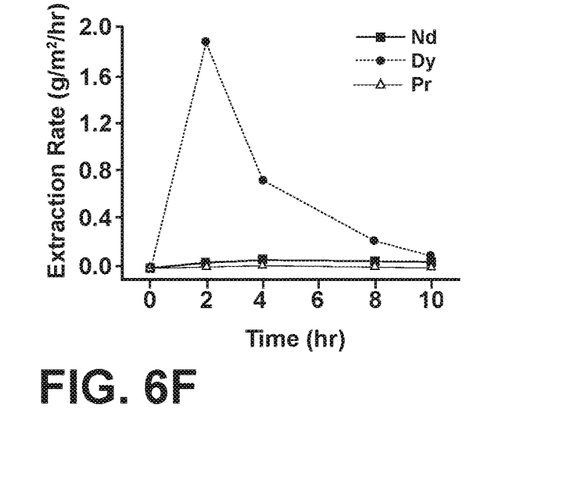
Figure 7A:
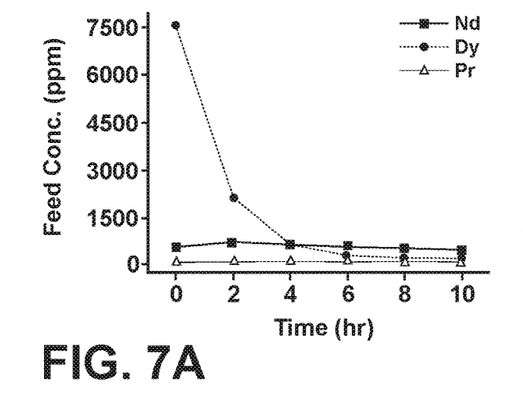
FIGS. 7A to 7F are graphs illustrating the stage-three recovery of Dy from mixed rare earth element oxides.
Figure 7B:
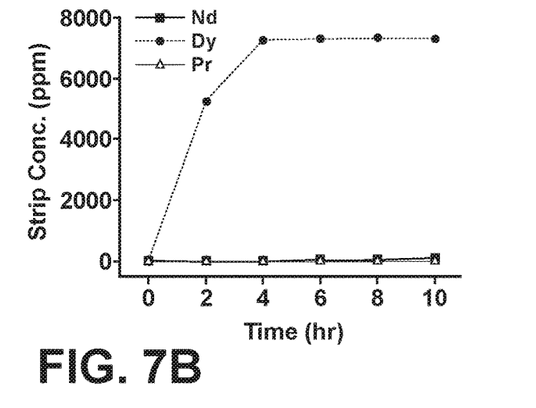
Figure 7C:
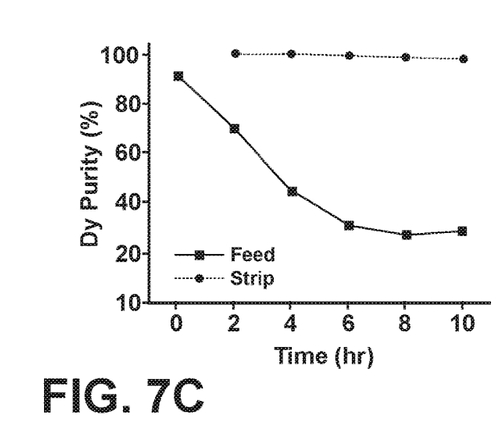
Figure 7D:
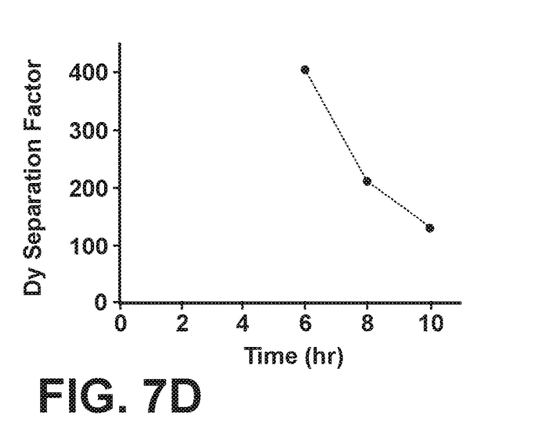
Figure 7E:
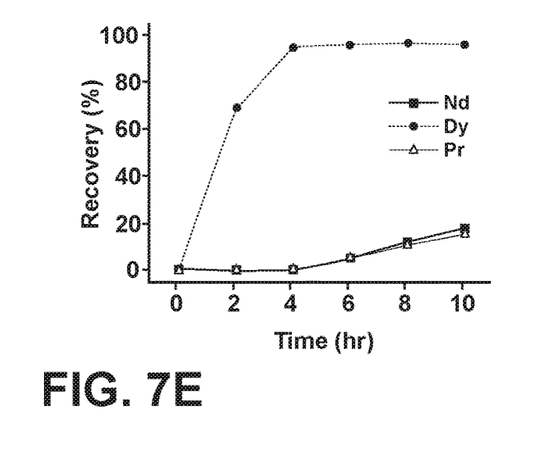
Figure 7F:
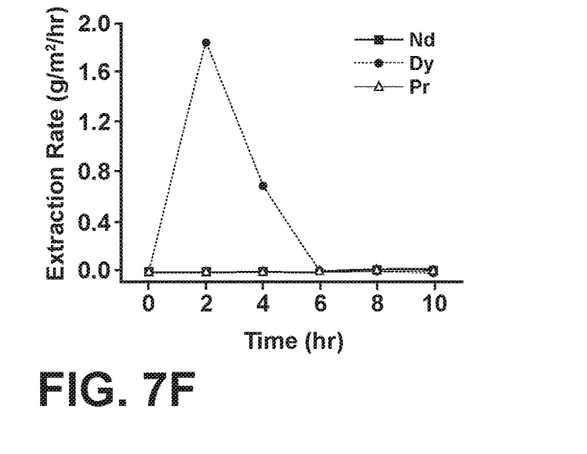

The following non-limiting example depicts the method of FIG. 4 for the selective separation of Dy in substantially pure form from Nd and Pr.

An aqueous feed solution was prepared by dissolving REOs previously recovered from scrap magnets in a 0.02 M nitric acid solution. The pH of the feed solution (1000 mL) was maintained at 1.5 to 2.0. The organic phase included Cyanex 572 (33 v/v %) and Isopar L (67 v/v %). The organic phase was loaded into the fiber membrane pores through the bottom of the lumen side of the module. A volume of 1000 mL of 3.0 M nitric acid was used as a strip solution. The feed solution and the strip solution were continuously recirculated through the bottom of the module along the shell and lumen side of the module, respectively. The feed and strip flow rates were about 250 mL/min and 70 mL/min, respectively. No pressure differential was applied between the feed side and the strip side. First stage separation was conducted for 24 hours. For second stage separation, the pH of the strip of the first stage was adjusted to 1.5 by adding ammonium hydroxide and used as the feed for the second stage. The solution was filtered using a 2.2 μm filter paper to remove any precipitated salts. Second stage separation was conducted for 10 hours. For third stage separation, the pH of the strip solution of the second stage was adjusted to 1.5 by adding ammonium hydroxide and used as the feed for the third stage. Third stage separation was conducted for 10 hours. After completing the recovery of Dy from the feed solution, the third stage strip solution was treated with oxalic acid to precipitate the Dy. The Dy was washed with deionized water and dried at ambient temperature overnight. The Dy was annealed at 860° C. for 10 hours with a ramp up of 3° C./min to obtain $Dy_2O_3$.

The initial feed solution contained 27,000 ppm of Nd, 8,200 ppm of Pr and 12,800 ppm of Dy. 100% pure Dy was obtained in 3-stages of the membrane solvent extraction process. The recovery of Dy in stage 1, stage 2 and stage 3 was 66%, 97% and 96%, respectively, which resulted in a cumulative recovery of 61%. The Dy extraction rate in stage 1, stage 2 and stage 3 was 0.42 g/m²/hr, 0.87 g/m²/hr and 1.2 g/m²/hr, respectively. In every stage, a high separation factor was obtained which indicates high separation efficiency of the supported membrane solvent extraction system. FIGS. 5A-5F depict the first stage composition of the (A) feed solution (B) strip solution, (C) purity (%) of Dy in the feed solution and the strip solution, (D) Dy separation factor, (E) REE recovery, and (F) REE recovery rates. FIGS. 6A-6F depict the second stage composition of the (A) feed solution (B) strip solution, (C) purity (%) of Dy in the feed solution and the strip solution, (D) Dy separation factor, (E) REE recovery, and (F) REE recovery rates. Lastly, FIGS. 7A-7F depict the third stage composition of the (A) feed solution (B) strip solution, (C) purity (%) of Dy in the feed solution and the strip solution, (D) Dy separation factor, (E) REE recovery, and (F) REE recovery rates.

Figure 8:
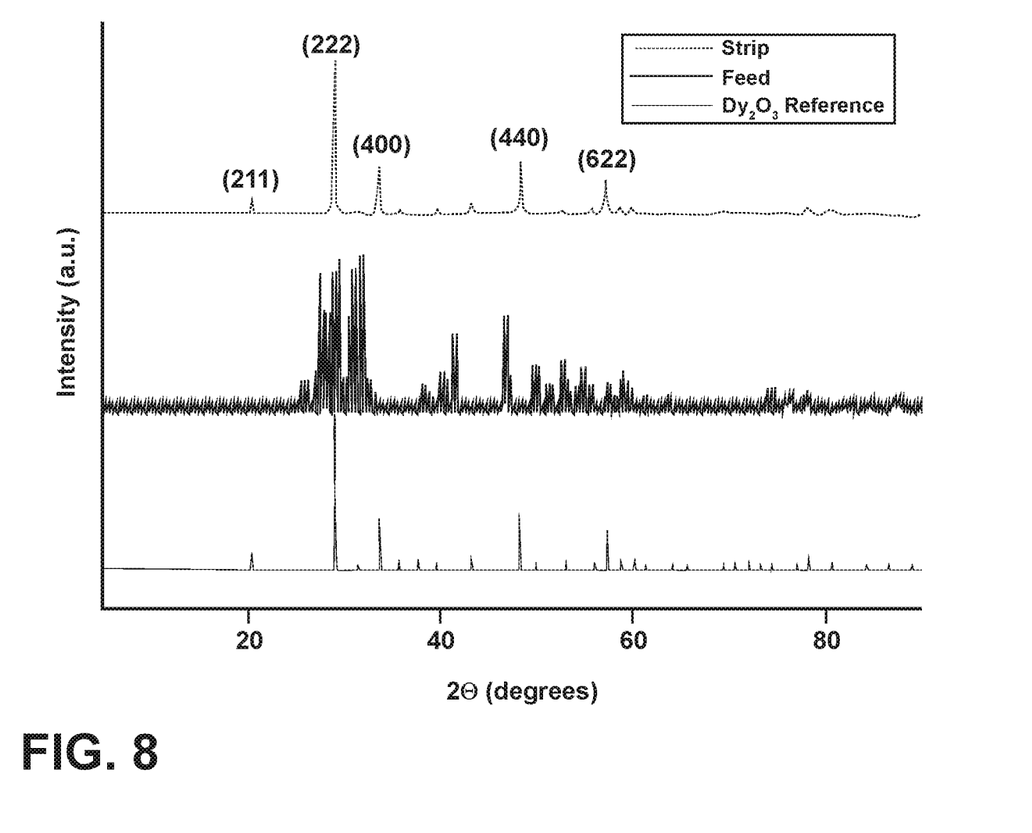
FIG. 8 is an X-ray diffraction (XRD) analysis of Dy obtained from the strip solution after third stage recovery, with standard $Dy_2O_3$ as a reference.

FIG. 8 shows the phase and purity of the recovered Dy using XRD. In particular, the XRD pattern of the feed solution (prior to first stage separation) shows that the feed solution contained $Nd_2O_3$, $Pr_2O_3$ and $Dy_2O_3$. The XRD pattern of the strip solution (after third stage separation) indicated that the recovered product contained only $Dy_2O_3$ and the characteristic peaks exactly match with the standard $Dy_2O_3$ reference data. Praseodymium and neodymium oxide species from the starting material were not detected in the product obtained from the strip solution after the third stage.

The separation and recovery of rare earth elements was also found by the inventors to be dependent on the pH of the feed solution. A feed solution with a pH of between 0 and 2.0, or approximately 1.5, was found to work well for the separation of Dy using Cyanex 572. In the supported membrane solvent extraction process, the pH of the feed solution reduces over time due to the hydrogen ion transfer from the strip solution to the feed solution while metal ions are transferred from the feed solution to the strip solution. To increase the recovery of Dy, the pH of the feed solution can be maintained between 1.0 and 1.5 by adding ammonium hydroxide solution every three hours, for example. The foregoing pH adjustment was found to lead to a higher recovery of Dy and a higher Dy extraction rate without significantly impacting purity.

Example 2

Figure 9:
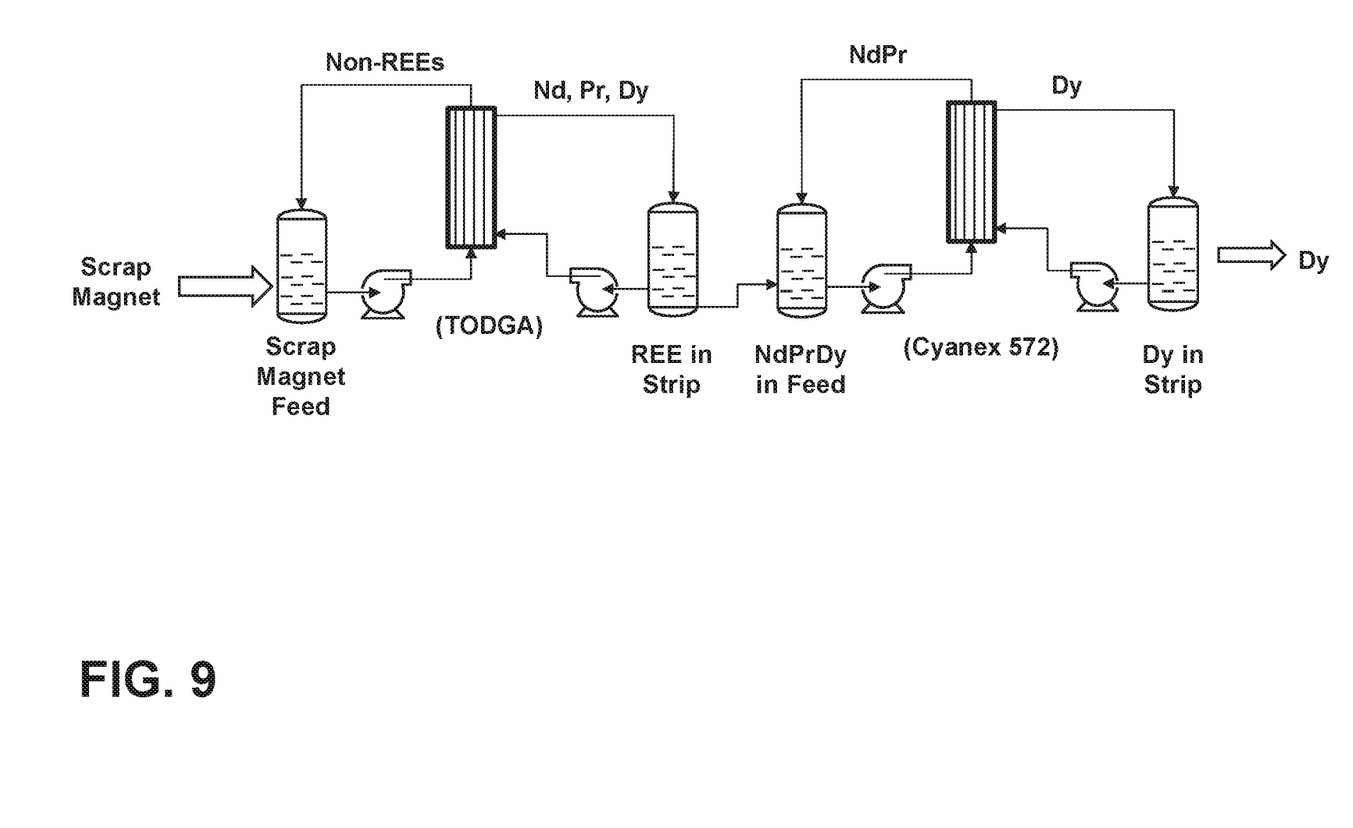
FIG. 9 is an illustration of a system for membrane solvent extraction of REEs and the subsequent separation of Dy from Nd and Pr.
Figure 10A:
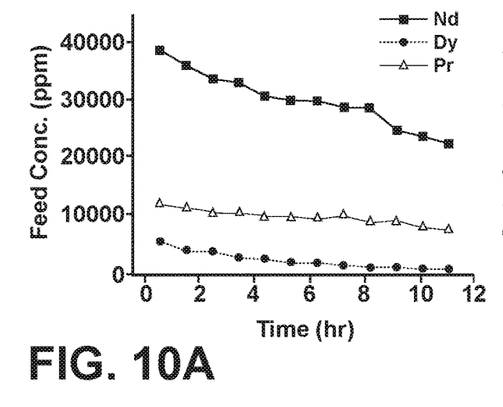
FIGS. 10A to 10F are graphs illustrating Dy separation from rare earth elements recovered from scrap magnets using the system of FIG. 9.
Figure 10B:
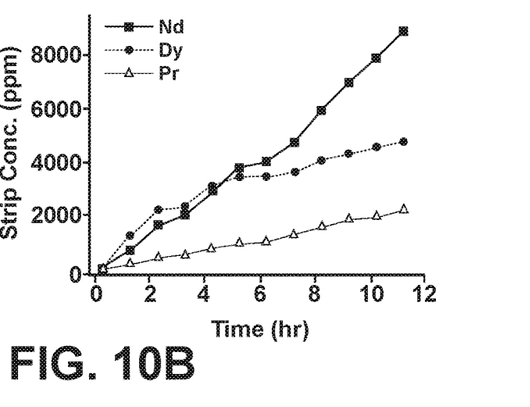
Figure 10C:
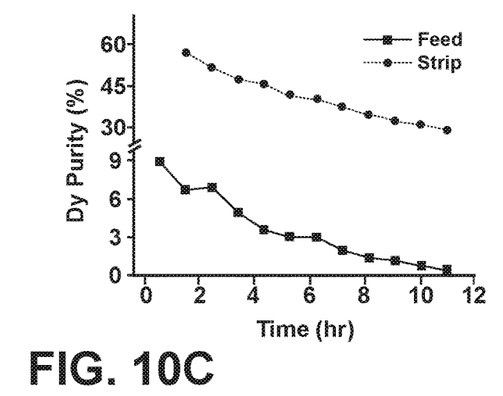
Figure 10D:
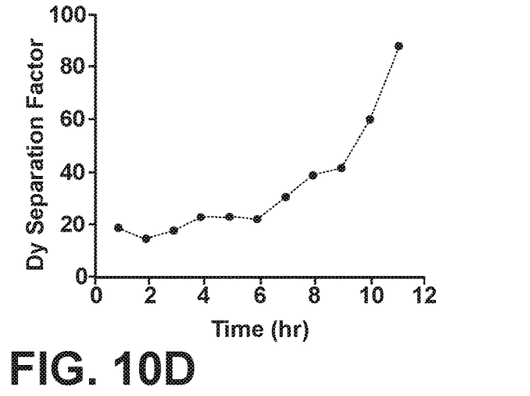
Figure 10E:
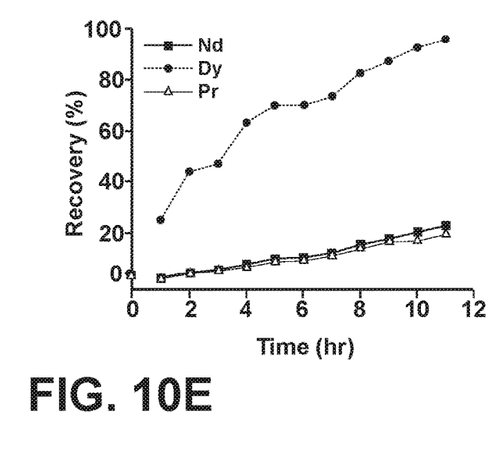
Figure 10F:
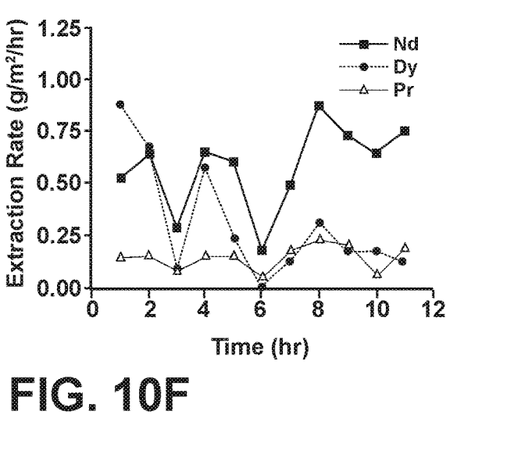

In a modification of the method set forth above, Dy was directly recovered from scrap permanent magnets without intermediate steps (precipitation, annealing, and redis solution in acid) that would otherwise follow from the extraction of mixed REEs from scrap magnets. As shown in FIG. 9, for example, the strip solution ("REE in Strip") (using a neutral or cationic extractant such as TODGA or Cyanex) was directly applied to the feed solution for separating Dy from Nd and Pr. In particular, Dy separation was conducted from a solution of Nd of 38,753 ppm, Pr of 11,540 ppm, and Dy of 4,932 ppm, recovered from mixed scrap permanent magnet feedstocks. The feed solution (9 wt. % of Dy) included 1000 mL, 0.02 M $HNO_3$ and the strip solution included 1000 mL, 3.0 M $HNO_3$. The membrane module (1.4 m²) included as an extractant 33 vol. % Cyanex 572 with balance Isopar L. In the first stage, separation was conducted for 11 hours with feed solution pH adjustments every 1 hour as shown in FIGS. 10A-10F. The recovery, purity, and extraction rate of Dy were 97%, 29.8 wt. %, and 0.31 g/m²/hr, respectively, for the first stage. Additional stages of separation can be performed to obtain 100% Dy as shown in Example 1. The purity of the Nd Pr remained in the feed solution was 99.6 wt. %. These results demonstrated that the present method can recover Dy directly from scrap permanent magnets without intermediate precipitation, annealing, and redissolution in acid.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for the separation of rare earth elements, the method comprising:
introducing, into a liquid containing an acid, a pre-mixture of greater than 90% by weight of rare earth element oxides, wherein the pre-mixture includes an oxide of dysprosium, an oxide of neodymium, and an oxide of praseodymium, thereby obtaining an aqueous feed solution containing dysprosium as a heavy rare earth element and containing neodymium and praseodymium as light rare earth elements;

providing a plurality of hollow fibers each including a lumen side spaced apart from a shell side to define a membrane therebetween, the membrane including a plurality of pores dispersed therein;

pre-impregnating the plurality of pores of the membrane for each of the plurality of hollow fibers with an organic phase, the organic phase including an organic solvent and an extractant;

contacting one of the lumen side or the shell side of the plurality of hollow fibers with the aqueous feed solution containing a concentration of the heavy rare earth element and a concentration of the light rare earth elements;

contacting the other of the lumen side or the shell side of the plurality of hollow fibers with a strip solution, wherein the heavy rare earth element is simultaneously back-extracted into the strip solution from the organic phase and the light rare earth elements have remained in the aqueous feed solution, such that the concentration of dysprosium as the heavy rare earth element is greater in the strip solution than in the aqueous feed solution; and precipitating the strip solution to recover a precipitate of greater than 99.5% by weight of one or more oxides of dysprosium.

2. The method according to claim 1 further includes actively maintaining the pH of the aqueous feed solution between 0 and 2.0.

3. The method according to claim 1 wherein the organic solvent and the extractant include a ratio by volume of between 1:1 and 3:1, or any other combination.

4. The method according to claim 3 wherein the organic solvent includes an isoparaffinic hydrocarbon, tributyl phosphate, xylene, hexane, octanol or kerosene and the extractant is a chelating extractant.

5. The method according to claim 1 wherein the strip solution includes nitric acid, hydrochloric acid, or sulfuric acid.

6. The method according to claim 1 wherein the concentration of the light rare earth element in the strip solution remains less than 5% by weight.

7. The method according to claim 1 wherein the plurality of hollow fibers defines a mean pore size of 10-1000 nm.

8. The method according to claim 1 wherein the extractant is a cationic extractant or a neutral extractant.

9. A method for the separation of rare earth elements, the method comprising:

dissolving a mixture of greater than 90% by weight of $Nd_2O_3$, $Pr_2O_3$ and $Dy_2O_3$ in a mineral acid to obtain a feed solution including $Dy_2O_3$ as an oxide of a heavy rare earth element and including $Nd_2O_3$ and $Pr_2O_3$ as oxides of light rare earth elements, the feed solution having a pH of between 0 and 2.0;

providing a membrane module including a plurality of hollow fibers, the plurality of hollow fibers including a lumen side spaced apart from a shell side to define a membrane therebetween, the membrane including a plurality of pores dispersed therein;

pre-impregnating the plurality of pores of the membrane for each of the plurality of hollow fibers with an organic phase, the organic phase including an organic solvent and an extractant;

recirculating a continuous flow rate of the feed solution along one of the lumen side or the shell side of the plurality of hollow fibers;

recirculating a continuous flow rate of a strip solution along the other of the lumen side or the shell side of the plurality of hollow fibers, wherein the heavy rare earth element is back-extracted into the strip solution from the organic phase and the light rare earth elements have remained in the feed solution; and precipitating the strip solution to recover a solid of greater than 99.5% by weight of $Dy_2O_3$.

10. The method according to claim 9 further includes actively maintaining the pH of the feed solution between 0 and 2.0.

11. The method according to claim 9 wherein the organic solvent and the extractant include a ratio by volume of between 1:1 and 3:1.

12. The method according to claim 9 wherein the organic solvent includes an isoparaffinic hydrocarbon, tributyl phosphate, xylene, hexane, octanol or kerosene and the extractant is a chelating extractant.

13. The method according to claim 9 wherein the strip solution includes nitric acid, hydrochloric acid, or sulfuric acid.

14. The method according to claim 9 wherein the concentration of the light rare earth element in the strip solution remains less than 5% by weight.

15. The method according to claim 9 wherein the plurality of hollow fibers defines a mean pore size of 10-1000 nm.

16. The method according to claim 9 wherein directing a continuous flow rate of the feed solution and directing a continuous flow rate of the strip solution are performed for a first predetermined time period during a first stage separation, the method further including converting the strip solution from the first stage separation into a feed solution for a second stage separation by adjusting its pH to between 0 and 2.0 and thereafter:

directing a continuous flow rate of the second stage feed solution along one of the lumen side or the shell side of the plurality of hollow fibers; and directing a continuous flow rate of a second stage strip solution along the other of the lumen side or the shell side of the plurality of hollow fibers, wherein a concentration of the heavy rare earth element in the second stage strip solution is greater than the concentration of the heavy rare earth element in the strip solution from the first stage separation.

17. The method according to claim 9 wherein the extractant is a cationic extractant or a neutral extractant.

* * * * *